US011105398B1

(12) United States Patent
Brodhead et al.

(10) Patent No.: US 11,105,398 B1
(45) Date of Patent: Aug. 31, 2021

(54) OFFSET TORQUE MULTIPLIER

(71) Applicant: The Boeing Company, Chicago, IL (US)

(72) Inventors: James Eric Brodhead, Everett, WA (US); Dorin Nectarie Salcescu, Abbotsford (CA)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/918,138

(22) Filed: Jul. 1, 2020

(51) Int. Cl.
| F16H 1/46 | (2006.01) |
| B25B 13/48 | (2006.01) |
| F16H 57/02 | (2012.01) |
| B25B 23/00 | (2006.01) |

(52) U.S. Cl.
CPC ............ F16H 1/46 (2013.01); B25B 23/0007 (2013.01); F16H 57/02 (2013.01); *B25B 13/481* (2013.01); *B25B 23/0078* (2013.01)

(58) Field of Classification Search
CPC .................. B25B 17/02; B25B 13/481; B25B 21/00–21/026; F16H 1/46
See application file for complete search history.

(56) References Cited

U.S. PATENT DOCUMENTS

| 2,335,797 | A | * | 11/1943 | Schreiber | ............ | F16H 61/0293 74/342 |
| 5,176,047 | A | * | 1/1993 | Bai | ......................... | B25B 17/00 81/57.24 |
| 5,354,246 | A | * | 10/1994 | Gotman | ................. | B25B 13/488 475/248 |
| 5,540,629 | A | * | 7/1996 | Gotman | ................. | B25B 13/488 475/248 |
| 5,582,079 | A | * | 12/1996 | Matsumura | ........... | B25B 21/002 81/56 |
| 7,757,587 | B2 | * | 7/2010 | Kaneyama | .......... | B25B 23/0078 81/57.14 |
| 8,137,230 | B2 | * | 3/2012 | Omura | .................. | F16H 37/041 475/149 |
| 10,315,292 | B2 | * | 6/2019 | Chen | ...................... | B25B 13/481 |
| 2010/0093484 | A1 | * | 4/2010 | Huang | ................... | H02K 7/116 475/330 |

* cited by examiner

*Primary Examiner* — Sherry L Estremsky
(74) *Attorney, Agent, or Firm* — Quinn IP Law

(57) ABSTRACT

An offset torque multiplier includes an input planetary gearset configured to receive an input torque. The input planetary gearset includes an input sun gear. The input sun gear is rotatable about a first axis of rotation. The offset torque multiplier includes an output planetary gearset configured to provide an output torque. The output planetary gearset includes an output sun gear. The output sun gear is rotatable about a second axis of rotation. The second axis of rotation is offset from the first axis of rotation. The offset torque multiplier includes at least one intermediate planetary gearset coupled between the input planetary gearset and the output planetary gearset. The output torque is greater than the input torque.

20 Claims, 6 Drawing Sheets

US 11,105,398 B1

OFFSET TORQUE MULTIPLIER

TECHNICAL FIELD

The present disclosure generally relates to a tool, and more particularly, to an offset torque multiplier.

BACKGROUND

During assembly of some mechanical systems, such as aircraft, some components may need to be connected to another component. To do so, a fastener may be used to connect two components together. A tool may be used to apply torque to the fastener, thereby connecting one component to another component via the fastener.

SUMMARY

It is sometimes useful to apply torque to an object, such as a fastener, to assemble a device. To do so, a torque multiplier may be used to apply torque to the object. The torque multiplier receives an input torque and delivers an output torque that is greater than the input torque. Sometimes, however, the output torque is applied in a confined space. It is therefore desirable to develop a torque multiplier capable of applying a predetermined amount of output torque in a confined space. To this end, the torque multiplier may include one or more planetary gearsets that are offset to at least another planetary gearset. By using planetary gearsets that are offset the relative to each other, the size of the torque multiplier may be minimized, thereby allowing the offset torque multiplier to apply a predetermined amount of output torque in a confined space. Further, by offsetting the planetary gearsets of the torque multiplier, the efficiency of the torque multiplier is maximized, while the weight of the torque multiplier is minimized.

The present disclosure describes an offset multiplier configured to receive an input torque and to supply an output torque that is greater than the input torque. In an aspect of the present disclosure, the offset torque multiplier includes an input planetary gearset configured to receive an input torque. The input planetary gearset includes an input sun gear. The input sun gear is rotatable about a first axis of rotation. The offset torque multiplier further includes an output planetary gearset configured to provide an output torque. The output planetary gearset includes an output sun gear. The output sun gear is rotatable about a second axis of rotation, and the second axis of rotation is offset from the first axis of rotation. The offset torque multiplier further includes at least one intermediate planetary gearset coupled between the input planetary gearset and the output planetary gearset. The output torque is greater than the input torque.

In an aspect of the present disclosure, the offset torque multiplier may further include an intermediate helical gear coupled to the input planetary gearset to allow torque transmission between the input planetary gearset and the intermediate planetary gearset.

In an aspect of the present disclosure, the intermediate helical gear may be configured to rotate about the second axis of rotation.

In an aspect of the present disclosure, the offset torque multiplier may further include a housing. Each of the input planetary gearset, the output planetary gearset, and the intermediate planetary gearset may be disposed inside the housing.

In an aspect of the present disclosure, the offset torque multiplier may further include a socket coupled to the input sun gear to transmit the input torque to the input planetary gearset.

In an aspect of the present disclosure, the offset torque multiplier may further include a multiplier output and a housing. The output planetary gearset may be disposed inside the housing. The multiplier output may protrude from the output planetary gearset. The multiplier output may be at least partially disposed outside the housing.

In an aspect of the present disclosure, the torque ratio between the input torque and the output torque may be between 25:1 and 1000:1.

In an aspect of the present disclosure, the offset torque multiplier may further include a housing. The input planetary gearset may be disposed inside the housing. The input planetary gearset may include an input ring gear integrally coupled to the housing.

In an aspect of the present disclosure, the offset torque multiplier may further include a housing. The input planetary gearset may be disposed inside the housing. The housing may have a first cavity. The housing may have a first inner wall. The first inner wall may surround the first cavity. The input planetary gearset may be disposed in the first cavity. The input planetary gearset may include an input ring gear. The input ring gear may include a plurality of input ring gear teeth extending from the first inner wall toward the first axis of rotation.

In an aspect of the present disclosure, the housing may have a second cavity spaced apart from the first cavity. The housing may have a second inner wall. The second inner wall may surround the second cavity. The output planetary gearset may be disposed in the second cavity. The output planetary gearset may include an output ring gear. The output ring gear may include a plurality of output ring gear teeth extending from the second inner wall toward the second axis of rotation.

The present disclosure also describes a tool assembly. In an aspect of the present disclosure, the tool assembly includes an input torque device and an offset torque multiplier coupled to the input torque device. The input torque device is configured to provide an input torque to the offset torque multiplier. The offset torque multiplier includes an input planetary gearset configured to receive the input torque. The input planetary gearset includes an input sun gear. The input sun gear of the first planetary gearset is rotatable about a first axis of rotation. The offset torque multiplier further includes an output planetary gearset configured to provide an output torque. The output planetary gearset includes an output sun gear. The output sun gear of the second planetary gearset is rotatable about a second axis of rotation. The second axis of rotation is offset from the first axis of rotation. The offset torque multiplier may include at least one intermediate planetary gearset coupled between the input planetary gearset and the output planetary gearset. The output torque is greater than the input torque.

In an aspect of the present disclosure, the tool assembly may further include an intermediate helical gear coupled to the input planetary gearset to allow torque transmission between the input planetary gearset and the intermediate planetary gearset.

In an aspect of the present disclosure, the intermediate helical gear may be configured to rotate about the second axis of rotation.

In an aspect of the present disclosure, the tool assembly may further include a housing. Each of the input planetary gearset, the output planetary gearset, and the intermediate planetary gearset may be disposed inside the housing.

In an aspect of the present disclosure, the tool assembly may further include a socket coupled to the input sun gear to transmit the input torque to the input planetary gearset.

In an aspect of the present disclosure, the tool assembly may further include a multiplier output and a housing. The output planetary gearset may be disposed inside the housing. The multiplier output may protrude from the output planetary gearset. The multiplier output may be at least partially disposed outside the housing.

In an aspect of the present disclosure, the torque ratio between the input torque and the output torque may be between 25:1 and 1000:1.

In an aspect of the present disclosure, the tool assembly may further include a housing. The input planetary gearset may be disposed inside the housing. The input planetary gearset may include an input ring gear integrally coupled to the housing.

In an aspect of the present disclosure, the tool assembly may further include a housing. The input planetary gearset may be disposed inside the housing. The housing may have a first cavity. The housing may have a first inner wall. The first inner wall may surround the first cavity. The input planetary gearset may be disposed in the first cavity. The input planetary gearset may include an input ring gear. The input ring gear may include a plurality of input ring gear teeth extending from the first inner wall toward the first axis of rotation.

In an aspect of the present disclosure, the housing may have a second cavity spaced apart from the first cavity. The housing may have a second inner wall. The second inner wall may surround the second cavity. The output planetary gearset may be disposed in the second cavity. The output planetary gearset may include an output ring gear. The output ring gear may include a plurality of output ring gear teeth extending from the second inner wall toward the second axis of rotation.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
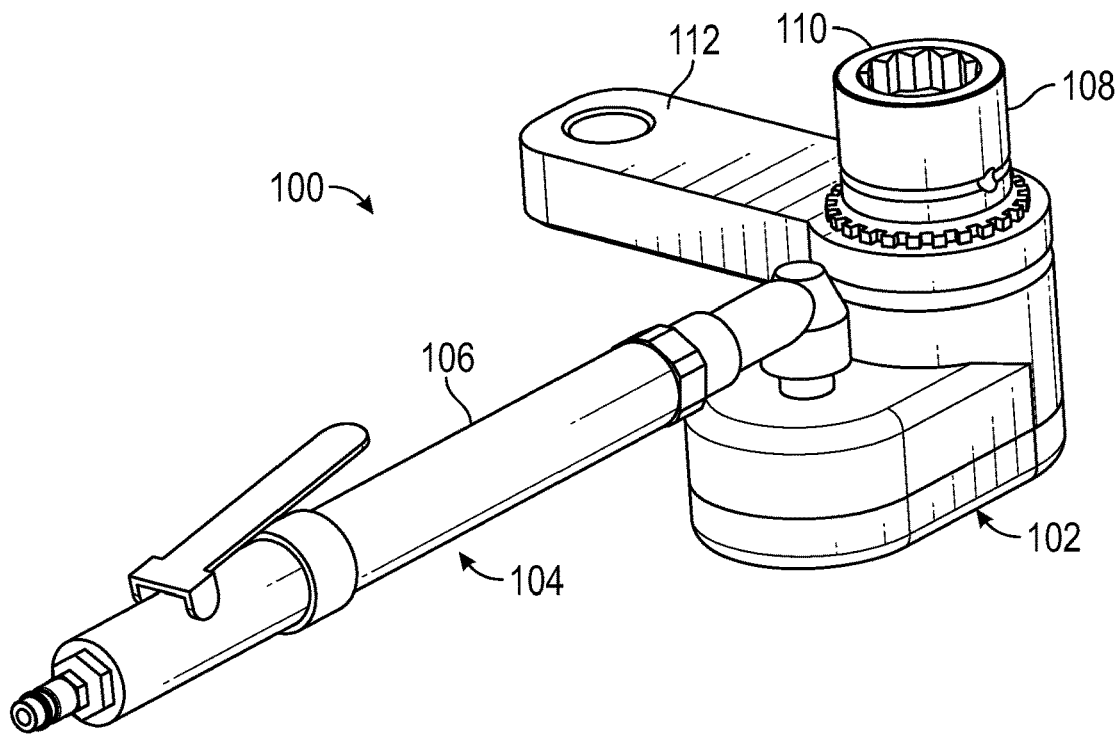
FIG. 1 is a schematic, perspective view of a tool assembly including an offset torque multiplier.
Figure 2:
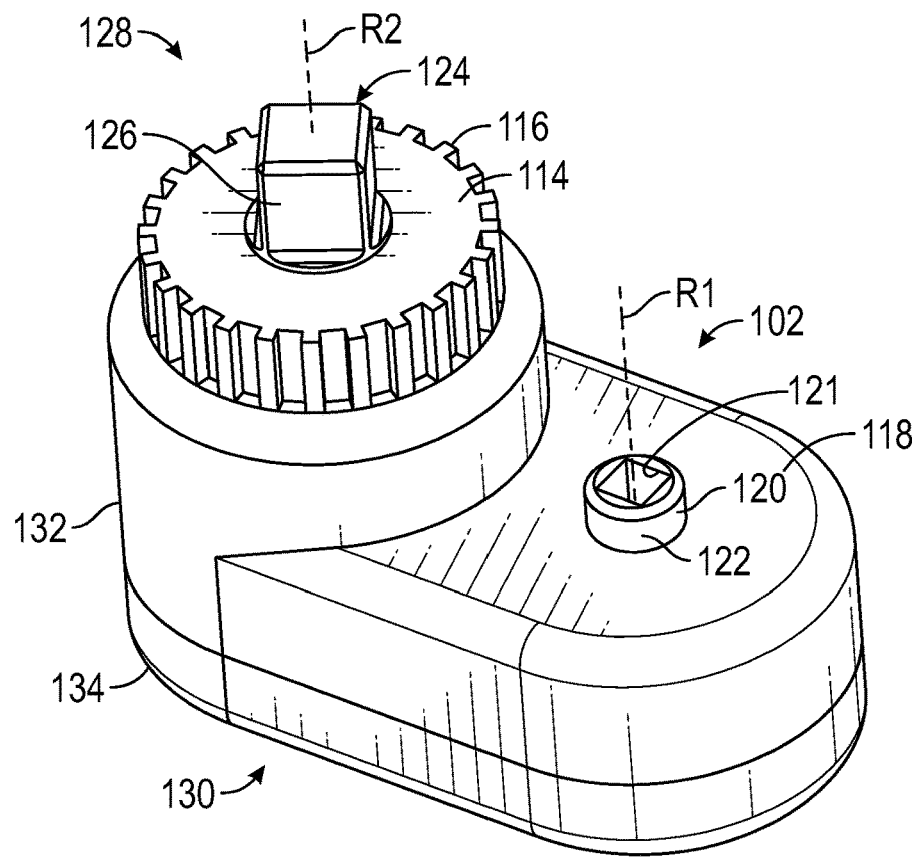
FIG. 2 is a schematic, perspective view of the offset torque multiplier of FIG. 1.

With reference to FIGS. 1 and 2, a tool assembly 100 includes an offset torque multiplier 102 configured to receive an input torque and provide an output torque that is greater than input torque. The tool assembly 100 includes an input torque device 104 coupled to the offset torque multiplier 102. The input torque device 104 is configured to provide the input torque to the offset torque multiplier 102. As a non-limiting example, the input torque device 104 may be a nut runner 106. However, it is envisioned that the input torque may be provided to the offset torque multiplier 102 by other suitable input torque device 104, such as a manual tool (e.g., wrench).

The tool assembly 100 further includes an output torque device 108 coupled to the offset torque multiplier 102. The output torque device 108 is configured to apply the output torque to, for example, a fastener. The output torque device 108 may be a socket wrench 110 configured to be coupled to a fastener. Consequently, the tool assembly 100 is configured to apply the output torque to, for example, a fastener via the output torque device 108 upon receipt of the input torque from the input torque device 104. The fastener may be a bolt or another suitable fastener. However, it is contemplated that the tool assembly 100 may be used, among other things, to apply the output torque to drive a winch or rotate a crane arm where it can be fitted along a bulkhead.

The tool assembly 100 may additionally include a reaction arm 112 coupled to the offset torque multiplier 102. The reaction arm 112 is configured to react with a reaction surface of another object, such as a bolt, when the tool assembly 100 is applying the output torque to a fastener in order to help applying the output torque to that fastener. During operation, the reaction arm 112 may rotate in an opposite direction from the rotation of the output torque until the reaction arm 112 contacts this reaction surface of the other object. As a consequence, the output torque applied by the tool assembly 100 is not transmitted back to the user of the tool assembly 100.

To facilitate coupling the reaction arm 112 to the offset torque multiplier 102, the offset torque multiplier 102 may include a spline coupling 114. The spline coupling 114 includes a plurality of annularly arranged splines 116 configured to mate with grooves in the reaction arm 112. However, other kinds of couplings may be used to connect the reaction arm 112 to the offset torque multiplier 102.

The offset torque multiplier 102 may include a housing 118 coupled to the spline coupling 114. The spline coupling 114 may be located outside the housing 118. The offset torque multiplier 102 may also include a multiplier input 120 at least partially disposed outside of the housing 118. The multiplier input 120 may include an input shaft 122 and is rotatable about a first axis of rotation R1. Moreover, the multiplier input 120 is configured to be coupled to the input torque device 104. Therefore, the input torque device 104 is configured to transmit the input torque to the offset torque multiplier 102 through the multiplier input 120. The multiplier input 120 may include a socket 121 configured to receive a portion of the input torque device 104 to allow torque transmission between the input torque device 104 and the offset torque multiplier 102.

In addition to the multiplier input 120, the offset torque multiplier 102 includes a multiplier output 124 at least partially disposed outside the housing 118. The multiplier output 124 may include an output shaft 126 and is rotatable about a second axis of rotation R2. The second axis of rotation R2 is offset from the first axis of rotation R1 to minimize the size of the offset torque multiplier 102. As a non-limiting example, the first axis of rotation R1 may be parallel to the second axis of rotation R2. It is envisioned, however, that the orientation of the first axis of rotation R1 and the second axis of rotation R2 may vary so long as the first axis of rotation R1 is not coaxial with the second axis of rotation R2.

The housing 118 includes a first housing side 128 and a second housing side 130 opposite the first housing side 128. As a non-limiting example, each of the multiplier input 120 and the multiplier output 124 is disposed outside of the housing 118 at the first housing side 128 to minimize the space occupied by the offset torque multiplier 102. Thus, no portion of the multiplier input 120 and the multiplier output 124 is disposed on the second housing side 130 of the housing 118. However, as discussed below, the multiplier input 120 and the multiplier output 124 may be disposed on opposite sides (i.e., the first housing side 128 and the second housing side 130) of the housing 118.

Figure 3:
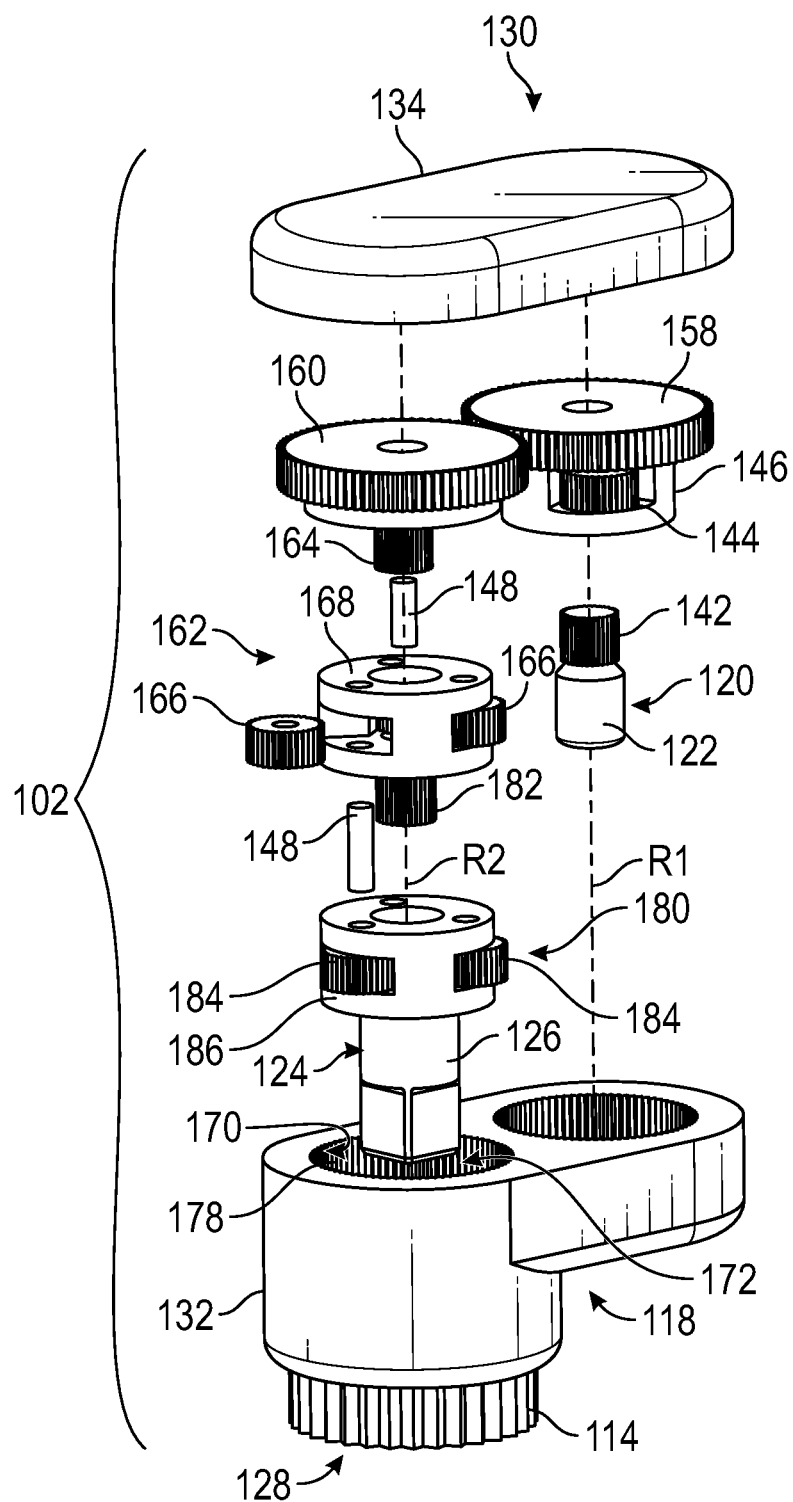
FIG. 3 is a schematic, perspective exploded view of the offset torque multiplier of FIG. 2.
Figure 4:
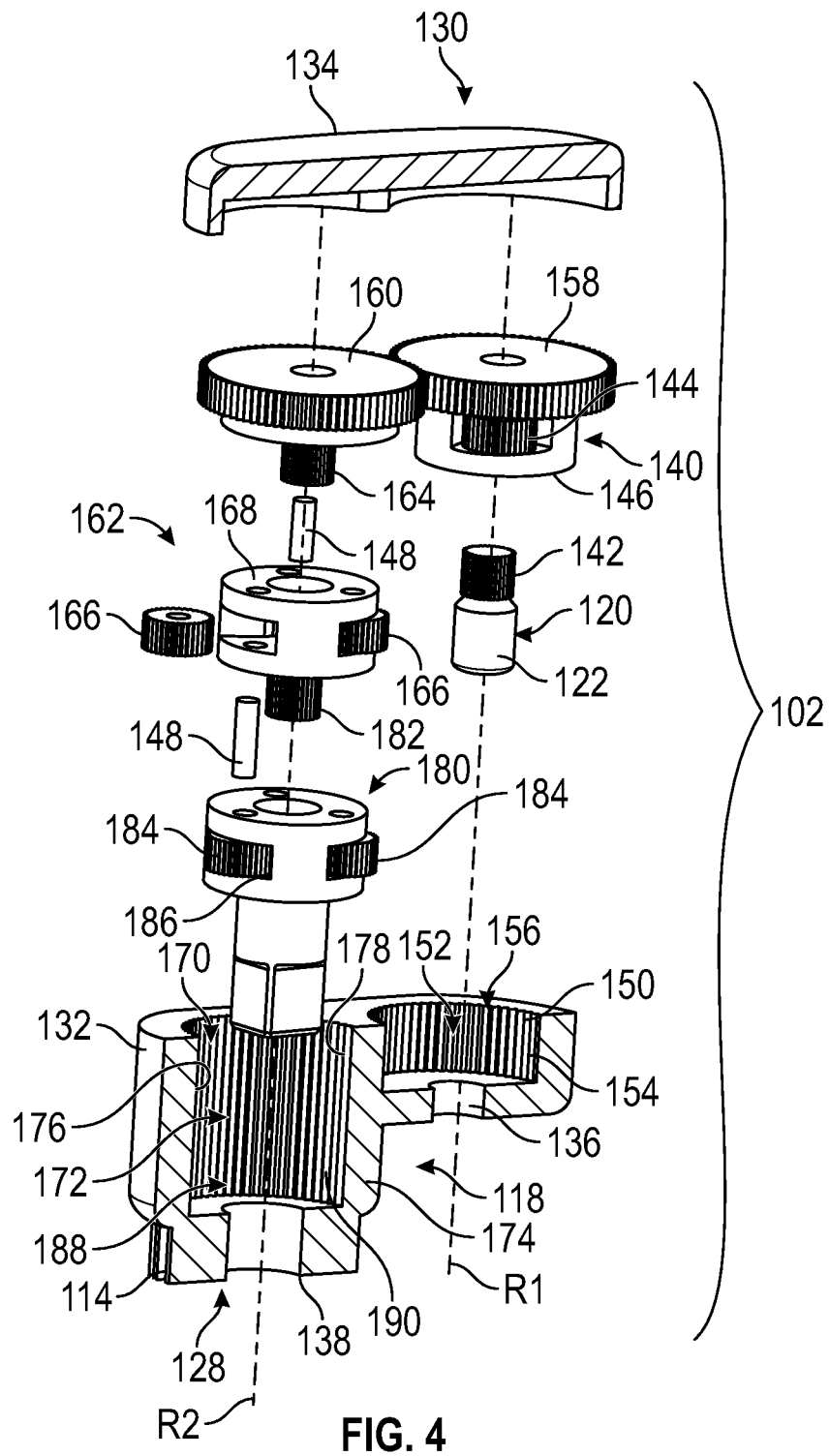
FIG. 4 is a schematic, perspective, cross-sectional view of the offset torque multiplier of FIG. 2.
Figure 5:
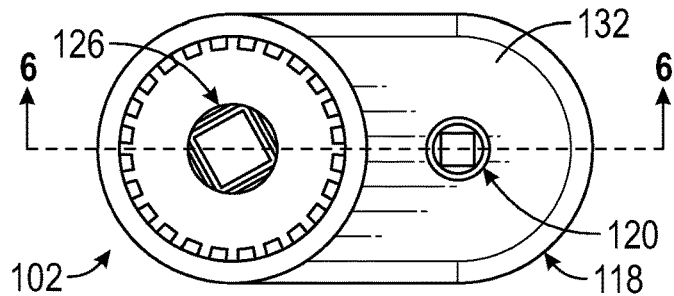
FIG. 5 is a schematic, top view of the offset torque multiplier of FIG. 2.
Figure 6:
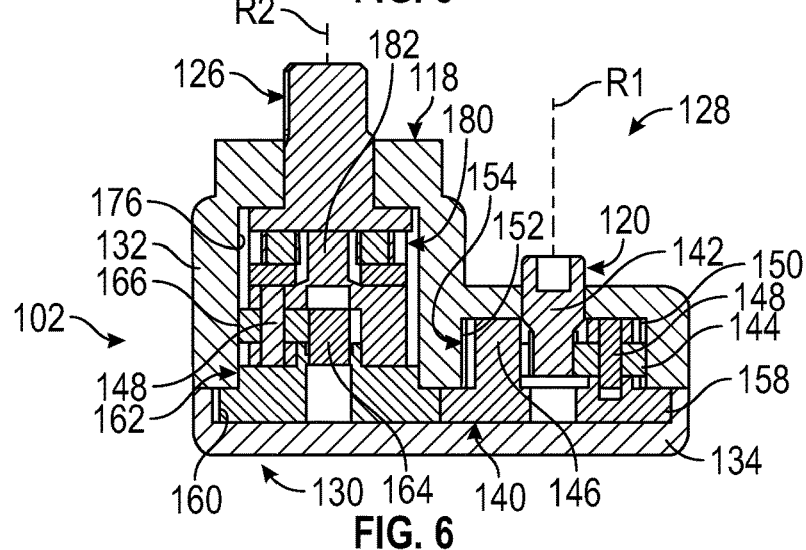
FIG. 6 is a schematic, cross-sectional side view of the offset torque multiplier of FIG. 2, taken along section line 6-6 of FIG. 5.
Figure 7:
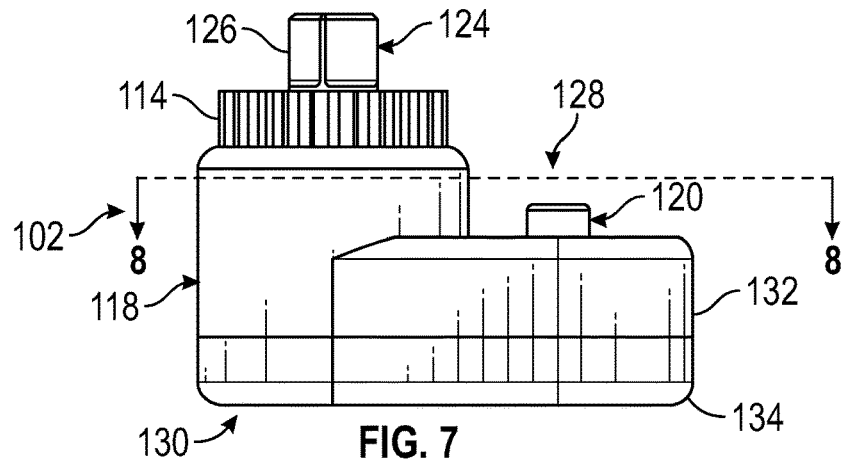
FIG. 7 is a schematic, side view of the offset torque multiplier of FIG. 2.
Figure 8:
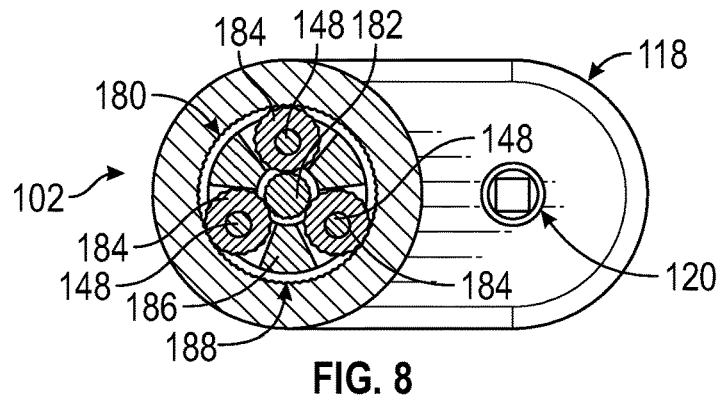
FIG. 8 is a schematic, cross-sectional top view of the offset torque multiplier of FIG. 2, taken along section line 8-8 of FIG. 2.
Figure 9:
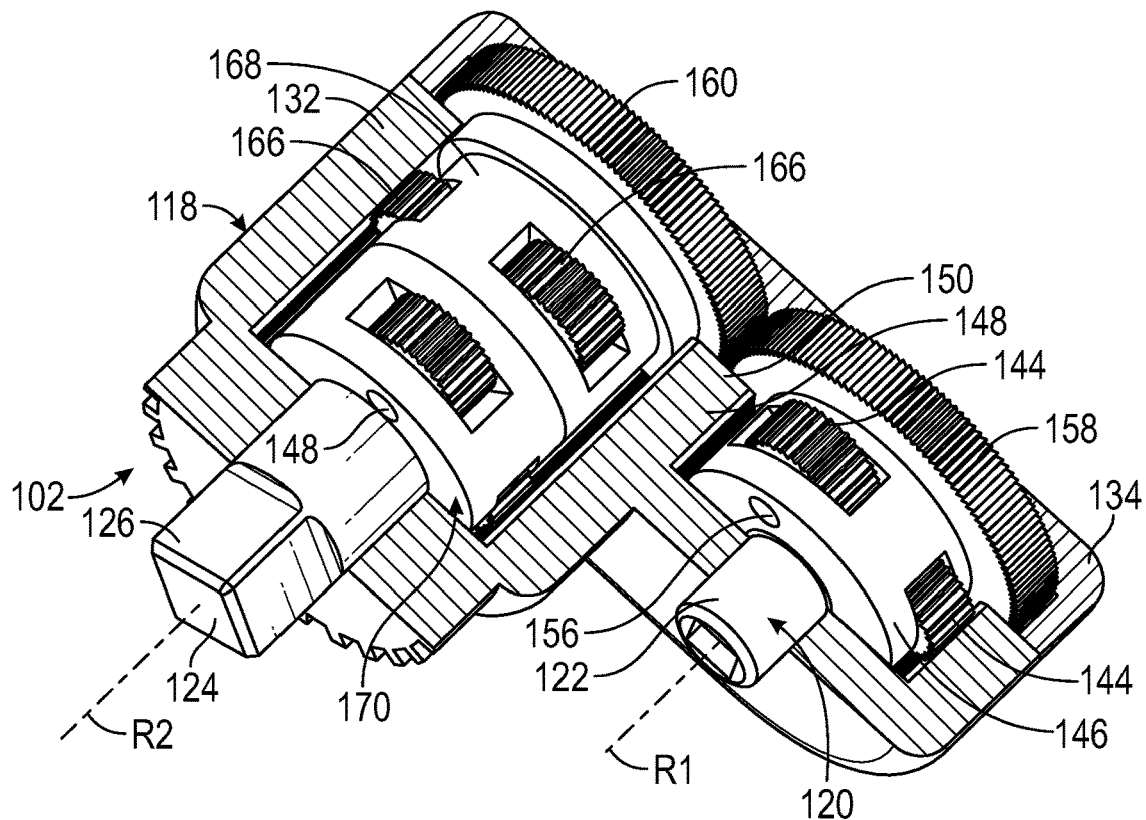
FIG. 9 is a schematic, perspective, top, cross-sectional view of the offset torque multiplier of FIG. 2.

With reference to FIGS. 3 and 4, the housing 118 may include a housing body 132 and a housing cover 134 configured to be detachably coupled to the housing body 132. The housing body 132 has an input opening 136 and an output opening 138 offset from the input opening 136. The output opening 138 extends along the second axis of rotation R2 and is sized to receive the multiplier output 124. The input opening 136 extends along the first axis of rotation R1 and is sized to receive the multiplier input 120.

With reference to FIGS. 3-9, the offset torque multiplier 102 includes an input planetary gearset 140 configured to receive the input torque from the input torque device 104 through the multiplier input 120. Thus, the input torque is transmitted from the input torque device 104 to the input planetary gearset 140. The input planetary gearset 140 includes an input sun gear 142 rotatable about the first axis of rotation R1. The input sun gear 142 may be integrally coupled to the input shaft 122 to enhance the structural integrity of the multiplier input 120. In the present disclosure, the term 'integrally coupled' means a coupling in which a first component and a second component are part of a one-piece structure. Thus, the input sun gear 142 and the input shaft 122 are part of a one-piece structure to enhance the structural integrity of the multiplier input 120. As such, the input sun gear 142 rotates at the same speed and in the same direction as the input shaft 122. Upon receipt of the input torque from the input torque device 104, the input sun gear 142 rotates about the first axis of rotation R1. Therefore, the input sun gear 142 is rotatable about the first axis of rotation R1. The socket 121 of the input shaft 122 is coupled to the input sun gear 142 to allow the transmission of the input torque from the input torque device 104 to the input planetary gearset 140.

The input planetary gearset 140 may be entirely disposed inside the housing 118 for protection and includes a plurality of input planet gears 144 each meshed with the input sun gear 142. Each of the input planet gears 144 rotates around the first axis of rotation R1 upon rotation of the input sun gear 142 about the first axis of rotation R1. The input planetary gearset 140 further includes an input carrier 146 connected to the input planet gears 144. One or more pins 148 (or another suitable fastener) connect the input planet gears 144 to the input carrier 146. Consequently, the input carrier 146 rotates about the first axis of rotation R1 upon rotation of the input planet gears 144 around the first axis of rotation R1.

The input planetary gearset 140 further includes an input ring gear 150 meshed with each of the input planet gears 144. The input ring gear 150 is integrally coupled to the housing 118. Accordingly, the input ring gear 150 and the housing 118 are part of a one-piece structure to minimize the space occupied by the offset torque multiplier 102. Because the input ring gear 150 is integrally coupled to the housing 118, the input ring gear 150 remains stationary with respect to the other components of the input planetary gearset 140 (e.g., the input sun gear 142, the input planet gears 144, and the input carrier 146). Therefore, the input planetary gearset 140 functions as a step-up gearset that supplies a torque that is greater than the torque received.

The housing 118 has a first cavity 152 sized to receive the input planetary gearset 140. The first cavity 152 therefore receives the input planetary gearset 140. In other words, the input planetary gearset 140 is disposed in the first cavity 152. The housing 118 has a first inner wall 154 surrounding the first cavity 152. The input ring gear 150 includes a plurality of input ring gear teeth 156 extending from the first inner wall 154 toward the first axis of rotation R1 to allow the input ring gear 150 to mesh with the input planet gears 144.

The offset torque multiplier 102 further includes one or more intermediate helical gears. However, spur gears, miter gears, or other suitable intermediate gears may be used to transfer torque from the input planetary gearset 104. As a non-limiting example, the offset torque multiplier 102 includes a first intermediate helical gear 158 and a second intermediate helical gear 160. The first intermediate helical gear 158 is continuously connected to the input planetary gearset 140 to allow torque transmission between the first intermediate helical gear 158 and the input planetary gearset 140. In particular, the first intermediate helical gear 158 may be directly and continuously connected to the input carrier 146. As a consequence, the input carrier 146 rotates in the same direction and the same speed as the first intermediate helical gear 158. Because the first intermediate helical gear 158 and the second intermediate helical gear 160 have a helical configuration, the input planetary gearset 140 is allowed to transfer torque to the second axis of rotation R2, which may be angled relative to the first axis of rotation R1 between zero degrees and ninety degrees. In other words, due to the helical configuration of the first intermediate helical gear 158 and the second intermediate helical gear 160, the first axis of rotation R1 may be: (a) parallel to the second axis of rotation R2; (b) obliquely angled relative to the second axis of rotation R2; or (c) oriented at a ninety degree angle relative to the second axis of rotation R2.

The second intermediate helical gear 160 is meshed to the first intermediate helical gear 158 to allow torque transmission between the first intermediate helical gear 158 and the second intermediate helical gear 160. The first intermediate helical gear 158 is rotatable about the first axis of rotation R1, whereas the second intermediate helical gear 160 is rotatable about the second axis of rotation R2 to minimize the space occupied by the offset torque multiplier 102.

The offset torque multiplier 102 further includes at least one intermediate planetary gearset 162 continuously connected to the second intermediate helical gear 160. Although the drawings show a single intermediate planetary gearset 162, it is contemplated that the offset torque multiplier 102 may include more than one intermediate planetary gearset 162 depending on the torque ratio desired between the output torque and the input torque. One or more intermediate planetary gearsets 162 may be disposed along the first axis of rotation R1 and/or the second axis of rotation R2. Regardless of the quantity, the intermediate planetary gearset 162 may be entirely disposed inside the housing 118 for protection. The offset torque multiplier 102 does not necessarily have the intermediate planetary gearset 162. In such case, an intermediate gear, such as the second intermediate helical gear 160, may be directly connected to the output planetary gearset 180.

The intermediate planetary gearset 162 includes an intermediate sun gear 164 continuously connected to the second intermediate helical gear 160. As such, the intermediate sun gear 164 and the second intermediate helical gear 160 both rotate about the second axis of rotation R2 at the same speed. The intermediate planetary gearset 162 further includes a plurality of intermediate planet gears 166 each meshed with the intermediate sun gear 164. Accordingly, each of the intermediate planet gears 166 rotates around the second axis of rotation R2 upon rotation of the intermediate sun gear 164 about the second axis of rotation R2.

The intermediate planetary gearset 162 further includes an intermediate carrier 168 coupled to each of the intermediate planet gears 166. One or more pins 148 may connect the intermediate carrier 168 to the intermediate planet gears 166. The intermediate carrier 168 rotates about the second axis of rotation R2 upon rotation of the intermediate planet gears 166 about the second axis of rotation R2.

The intermediate planetary gearset 162 also includes an intermediate ring gear 170 integrally coupled to the housing 118. As such, the intermediate ring gear 170 and the housing 118 are part of a one-piece structure to minimize the size of the offset torque multiplier 102. Because the intermediate ring gear 170 and the housing 118 are part of a one-piece structure, the intermediate ring gear 170 remains stationary with respect to the other components of the intermediate planetary gearset 162 (e.g., the intermediate carrier 168, the intermediate planet gears 166, and the intermediate sun gear 164). Therefore, the intermediate planetary gearset 162 functions as a step-up gearset that supplies a torque that is greater than the torque received.

The housing 118 has a second cavity 172 sized to receive the intermediate planetary gearset 162. The second cavity 172 therefore receives the intermediate planetary gearset 162. In other words, the intermediate planetary gearset 162 is disposed in the second cavity 172. The second cavity 172 is spaced apart from the first cavity 152. The housing 118 may include a diving wall 174 separating the first cavity 152 from the second cavity 172. The housing 118 has a second inner wall 176 surrounding the second cavity 172. The intermediate ring gear 170 includes a plurality of intermediate ring gear teeth 179 extending from the second inner wall 176 toward the second axis of rotation R2 to allow the intermediate ring gear 170 to mesh with the intermediate planet gears 166. The offset torque multiplier 102 may additionally include multiple intermediate cavities spaced apart between the first cavity 152 and the second cavity 172. Each of these multiple cavities may receive at least one intermediate planetary gearset 162. Each of these intermediate planetary gearsets 162 disposed in the intermediate cavities my include a respective intermediate ring gear 170. The respective intermediate ring gear 170 includes the plurality of ring gear teeth 179 extending from an inner wall of the housing 118.

The offset torque multiplier 102 also includes an output planetary gearset 180 continuously connected to the intermediate planetary gearset 162. Thus, one or more intermediate planetary gearsets 162 are coupled between the input planetary gearset 140 and the output planetary gearset 180. The output planetary gearset 180 is spaced apart from the intermediate planetary gearset 162 along the second axis of rotation R2 to generate a predetermined amount of output torque without the need to stack all of the planetary gearsets on top of each other, thereby minimizing the size of the offset torque multiplier 102. However, not all of the planetary gearsets have to be disposed along the same axis (e.g., the first axis of rotation R1 or the second axis of rotation R2). The output planetary gearset 180 is configured to provide the output torque. The output torque is greater than the input torque to facilitate the application of torque to another component, such as a bolt. The torque ratio between the input torque and the output torque may be between 25:1 and 1000:1 to provide sufficient torque to another component, such as a bolt, to perform a predetermined task, such as fastening the bolt to some parts.

The output planetary gearset 180 may be entirely disposed inside the housing 118 and includes an output sun gear 182 continuously connected to the intermediate carrier 168. As such, the output sun gear 182 and the intermediate carrier 168 rotate concomitantly at the same speed in the same direction. The output sun gear 182 rotates about the second axis of rotation R2 upon rotation of the intermediate carrier 168. As discussed above, the second axis of rotation R2 is offset from the first axis of rotation R1 to minimize the size of the offset torque multiplier 102.

The output planetary gearset 180 further includes a plurality of output planet gears 184 each meshed with the output sun gear 182. Accordingly, each of the output planet gears 184 rotates around the second axis of rotation R2 upon rotation of the output sun gear 182 about the second axis of rotation R2.

The output planetary gearset 180 further includes an output carrier 186 coupled to each of the output planet gears 184. One or more pins 148 may connect the output carrier 186 to the output planet gears 184. The output carrier 186 rotates about the second axis of rotation R2 upon rotation of the output planet gears 184 about the second axis of rotation R2.

The output planetary gearset 180 also includes an output ring gear 188 integrally coupled to the housing 118. As such, the output ring gear 188 and the housing 118 are part of a one-piece structure to minimize the size of the offset torque multiplier 102. Because the output ring gear 188 and the housing 118 are part of a one-piece structure, the output ring gear 188 remains stationary with respect to the other components of the output planetary gearset 180 (e.g., the output carrier 186, the output planet gears 184, and the intermediate sun gear 164). Therefore, the output planetary gearset 180 functions as a step-up gearset that supplies a torque that is greater than the torque received.

The second cavity 172 of the housing 118 is also sized to receive the output planetary gearset 180. The second cavity 172 therefore receives the intermediate planetary gearset 162 and the output planetary gearset 180. In other words, the intermediate planetary gearset 162 and the output planetary gearset 180 are disposed in the second cavity 172. The output ring gear 188 includes a plurality of output ring gear teeth 190 extending from the second inner wall 176 toward the second axis of rotation R2 to allow the output ring gear 188 to mesh with the output planet gears 184. The output ring gear 188 may be integrally coupled to the intermediate ring gear 178 to form a one-piece structure, thereby minimizing the size of the offset torque multiplier 102. One or more intermediate planetary gearsets 162 may be disposed between the input planetary gearset 160 and the output planetary gearset 180 in different configurations. For example, one or more intermediate planetary gearsets 162 may be obliquely angled along an intermediate axis relative to the either the first axis of rotation R1 or the second angle of rotation R2.

The multiplier output 124 is continuously connected to the output carrier 186 to supply the output torque. Specifically, the multiplier output 124 may protrude from the output carrier 186, through the output opening 138, toward the first housing side 128. At least a portion of the multiplier output 124 may be disposed outside the housing 118 at the first housing side 128. The multiplier input 120 may protrude from the input carrier 146, through the input opening 136, and toward the first housing side 128. At least a portion of the multiplier input 120 may be disposed outside the housing 118 at the first housing side 128.

Figure 10:
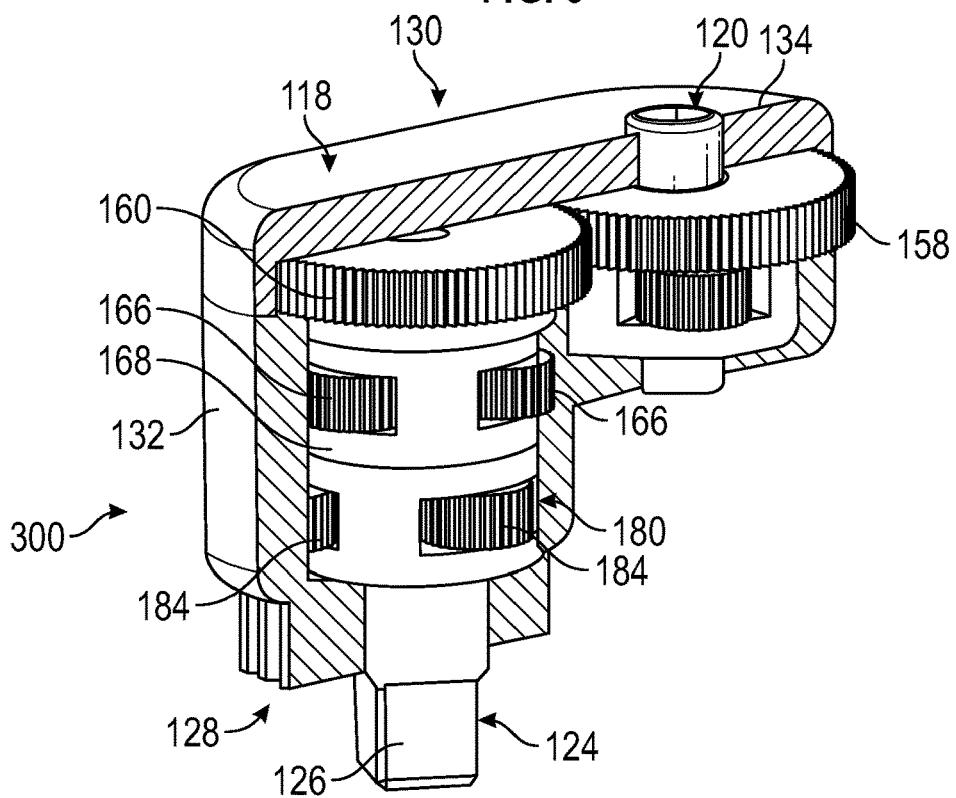
FIG. 10 is a schematic, perspective, side, cross-sectional view of an offset torque multiplier according to an aspect of the present disclosure.
Figure 11:
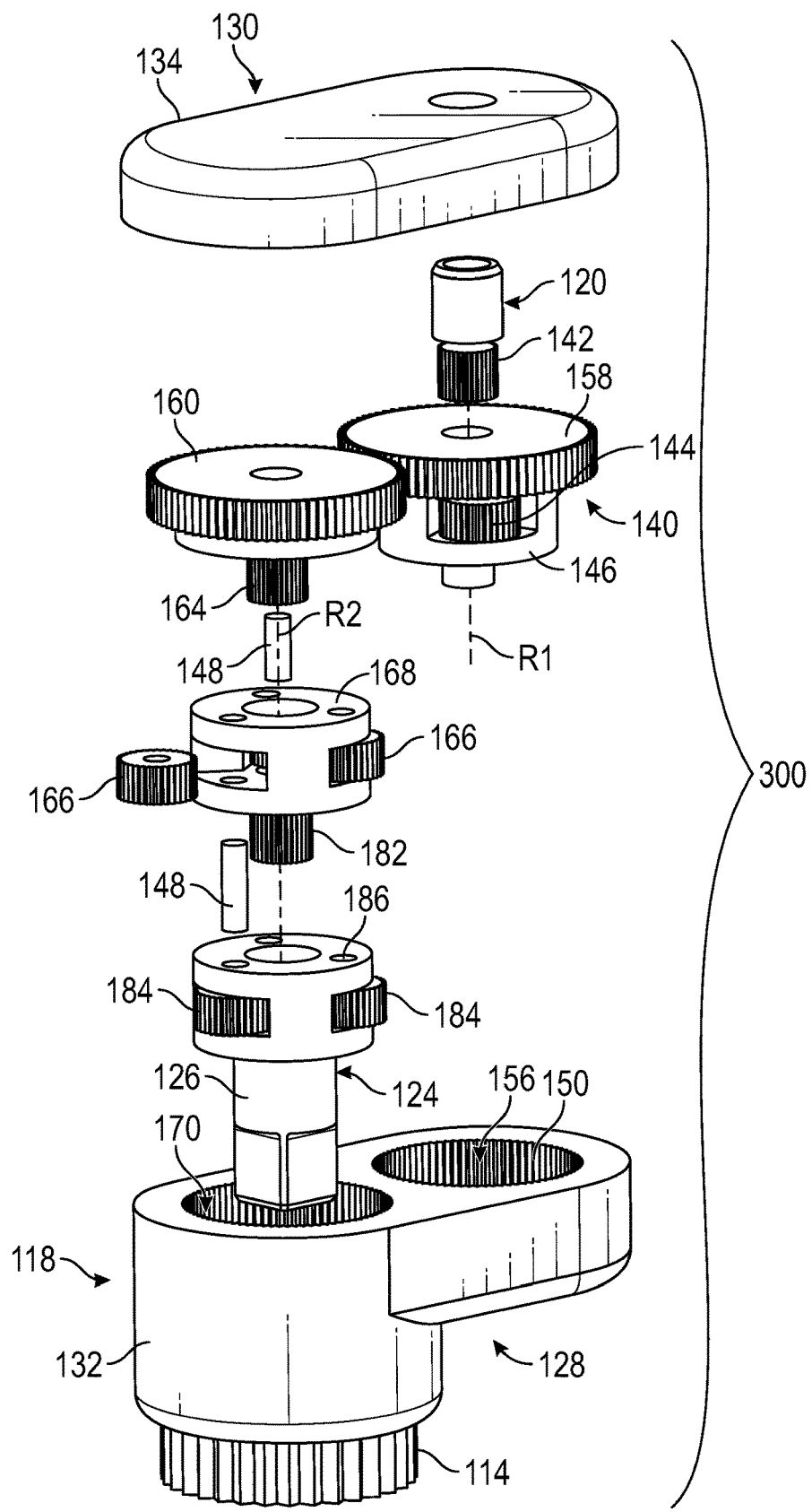
FIG. 11 is a schematic, perspective, exploded view of the offset torque multiplier of FIG. 10.

With reference to FIGS. 10 and 11, the structure and operation of the offset torque multiplier 300 is substantially similar to the offset torque multiplier 102 discussed above, except for the features described below. In the offset torque multiplier 300, the multiplier output 124 is partially disposed outside of the housing 118 at the first housing side 128, and the multiplier input 120 is partly disposed outside the housing 118 at the second housing side 130.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. An offset torque multiplier, comprising:
   an input planetary gearset configured to receive an input torque, the input planetary gearset includes an input sun gear and an input ring gear, and the input sun gear is rotatable about a first axis of rotation;
   an output planetary gearset configured to provide an output torque, the output planetary gearset includes an output sun gear, the output sun gear is rotatable about a second axis of rotation, and the second axis of rotation is offset from the first axis of rotation;
   an intermediate helical gear and at least one intermediate planetary gearset coupled between the input planetary gearset and the output planetary gearset;
   a housing, wherein each of the input planetary gearset and the output planetary gearset is disposed inside the housing, the input ring gear integrally coupled to the housing such that the input ring gear and the housing are part of a unitary one-piece structure, and the housing is fixed relative to the input sun gear and the output sun gear such that the input ring gear remains stationary upon rotation of the input sun gear and the output sun gear;
   wherein the intermediate helical gear is coupled to the input planetary gearset to allow torque transmission between the input planetary gearset and the at least one intermediate planetary gearset; and
   wherein the output torque is greater than the input torque.

2. The offset torque multiplier of claim 1, wherein the intermediate helical gear is configured to rotate about the second axis of rotation.

3. The offset torque multiplier of claim 1, wherein the at least one intermediate planetary gearset is disposed inside the housing.

4. The offset torque multiplier of claim 1, further comprising a socket coupled to the input sun gear to transmit the input torque to the input planetary gearset.

5. The offset torque multiplier of claim 1, further comprising a multiplier output, wherein the multiplier output protrudes from the output planetary gearset, and the multiplier output is at least partially disposed outside the housing.

6. The offset torque multiplier of claim 1, wherein a torque ratio between the input torque and the output torque is between 25:1 and 1000:1.

7. The offset torque multiplier of claim 1, wherein the housing has a first cavity, the housing has a first inner wall, the first inner wall surrounds the first cavity, the input planetary gearset is disposed in the first cavity, and the input ring gear includes a plurality of input ring gear teeth extending directly from the first inner wall toward the first axis of rotation.

8. The offset torque multiplier of claim 7, wherein the housing has a second cavity spaced apart from the first cavity, the housing has a second inner wall, the second inner wall surrounds the second cavity, the output planetary gearset is disposed in the second cavity, the output planetary gearset includes an output ring gear, and the output ring gear includes a plurality of output ring gear teeth extending directly from the second inner wall toward the second axis of rotation.

9. The offset torque multiplier of claim 1, wherein the input planetary gearset includes a plurality of input planet gears each meshed with the input sun gear, each of the plurality of input planet gears rotates around the first axis of rotation, and the input ring gear is meshed with each of the plurality of input planet gears.

10. A tool assembly, comprising:
an input torque device;
an offset torque multiplier coupled to the input torque device, wherein the input torque device is configured to provide an input torque to the offset torque multiplier, and the offset torque multiplier includes:
  an input planetary gearset configured to receive the input torque, the input planetary gearset includes an input sun gear and an input ring gear, and the input sun gear of the input planetary gearset is rotatable about a first axis of rotation;
  an output planetary gearset configured to provide an output torque, the output planetary gearset includes an output sun gear, the output sun gear of the output planetary gearset is rotatable about a second axis of rotation, and the second axis of rotation is offset from the first axis of rotation;
  a housing, wherein each of the input planetary gearset and the output planetary gearset is disposed inside the housing, the input ring gear integrally coupled to the housing such that the input ring gear and the housing are part of a unitary one-piece structure, and the housing is fixed relative to the input sun gear and the output sun gear such that the input ring gear remains stationary upon rotation of the input sun gear and the output sun gear; and
  wherein the output torque is greater than the input torque.

11. The tool assembly of claim 10, further comprising an intermediate helical gear and at least one intermediate planetary gearset coupled between the input planetary gearset and the output planetary gearset, wherein the intermediate helical gear is coupled to the input planetary gearset to allow torque transmission between the input planetary gearset and the at least one intermediate planetary gearset.

12. The tool assembly of claim 11, wherein the intermediate helical gear is configured to rotate about the second axis of rotation.

13. The tool assembly of claim 10, further comprising at least one intermediate planetary gearset coupled between the input planetary gearset and the output planetary gearset, wherein the at least one intermediate planetary gearset is disposed inside the housing.

14. The tool assembly of claim 10, further comprising a multiplier output, wherein the multiplier output protrudes from the output planetary gearset, and the multiplier output is at least partially disposed outside the housing.

15. The tool assembly of claim 10, wherein a torque ratio between the input torque and the output torque is between 25:1 and 1000:1.

16. The tool assembly of claim 10, wherein the housing has a first cavity, the housing has a first inner wall, the first inner wall surrounds the first cavity, the input planetary gearset is disposed in the first cavity, and the input ring gear includes a plurality of input ring gear teeth extending directly from the first inner wall toward the first axis of rotation.

17. The tool assembly of claim 16, wherein the housing has a second cavity spaced apart from the first cavity, the housing has a second inner wall, the second inner wall surrounds the second cavity, the output planetary gearset is disposed in the second cavity, the output planetary gearset includes an output ring gear, and the output ring gear includes a plurality of output ring gear teeth extending directly from the second inner wall toward the second axis of rotation.

18. A tool assembly, comprising:
an input torque device;
an offset torque multiplier coupled to the input torque device, wherein the input torque device is configured to provide an input torque to the offset torque multiplier, and the offset torque multiplier includes:
  an input planetary gearset configured to receive the input torque, the input planetary gearset includes an input sun gear and an input ring gear, and the input sun gear of the input planetary gearset is rotatable about a first axis of rotation;
  an output planetary gearset configured to provide an output torque, the output planetary gearset includes an output sun gear, the output sun gear of the output planetary gearset is rotatable about a second axis of rotation, and the second axis of rotation is offset from the first axis of rotation; and
wherein the output torque is greater than the input torque
  wherein the tool assembly further comprises a housing, the input planetary gearset is disposed inside the housing, and the input ring gear is integrally coupled to the housing such that the input ring gear and the housing are part of a unitary one-piece structure, and the housing is fixed relative to the input sun gear and the output sun gear such that the input ring gear remains stationary upon rotation of the input sun gear and the output sun gear.

19. The tool assembly of claim 18, further comprising an intermediate helical gear and at least one intermediate planetary gearset coupled between the input planetary gearset and the output planetary gearset, wherein the intermediate helical gear is coupled to the input planetary gearset to allow torque transmission between the input planetary gearset and the at least one intermediate planetary gearset.

20. The tool assembly of claim 18, wherein the intermediate helical gear is configured to rotate about the second axis of rotation.

* * * * *